United States Patent
Coudron

(10) Patent No.: US 11,465,473 B2
(45) Date of Patent: Oct. 11, 2022

(54) INTERFACING ELEMENT FOR A LOCK ZONE OF A MOTOR VEHICLE DOOR

(71) Applicant: Compagnie Plastic Omnium, Lyons (FR)

(72) Inventor: Philippe Coudron, Sainte-Julie (FR)

(73) Assignee: Compagnie Plastic Omnium, Lyons (FR)

( * ) Notice: Subject to any disclaimer, the term of this patent is extended or adjusted under 35 U.S.C. 154(b) by 291 days.

(21) Appl. No.: 16/722,552

(22) Filed: Dec. 20, 2019

(65) Prior Publication Data

US 2020/0199907 A1    Jun. 25, 2020

(30) Foreign Application Priority Data

Dec. 20, 2018  (FR) ...................................... 1873669

(51) Int. Cl.
*B60J 5/10* (2006.01)
*B60J 5/04* (2006.01)

(52) U.S. Cl.
CPC .............. *B60J 5/107* (2013.01); *B60J 5/0481* (2013.01); *B60J 5/0484* (2013.01); *B60J 5/105* (2013.01)

(58) Field of Classification Search
CPC ........ B60J 5/107; B60J 5/0484; B60J 5/0481; B62D 29/004

(Continued)

(56) References Cited

U.S. PATENT DOCUMENTS 3,676,405 A * 7/1972 Labana .............. C08G 18/8074
528/45
6,098,696 A * 8/2000 Styra ..................... B21C 23/145
160/201

(Continued)

FOREIGN PATENT DOCUMENTS

DE    102006050144 A1    4/2008
EP         2028082 A1 *   2/2009   ........... B62D 29/041

(Continued)

OTHER PUBLICATIONS

Characterization of Thermosets Part 20: Tensile Testing Part One. Polymer Innovation Blog. https://polymerinnovationblog.com/characterization-thermosets-part-20-tensile-testing-part-one/ (Year: 2017).*

(Continued)

*Primary Examiner* — Jason S Morrow
*Assistant Examiner* — Wenwei Zhuo
(74) *Attorney, Agent, or Firm* — Shackelford, Bowen, McKinley & Norton, LLP

(57) ABSTRACT

An interfacing element of a lock zone of a door of a motor vehicle. The interfacing element comprises: includes a support made of plastic material, intended to be attached to a lining of the door, the lining being made of plastic material and a reinforcing plate of the lock zone onto which a lock is intended to be fastened, the plate being integrated to the support by overmolding. The support is made of a material having a Young's modulus lower than that of the plastic material of the lining of the door, and a coefficient of elongation at break greater than that of the plastic material of the lining of the door. A sub-assembly of motor vehicle includes a lining of tailgate and an interfacing element fastened onto an outer face of the lining.

17 Claims, 2 Drawing Sheets

(58) Field of Classification Search
USPC .......................... 296/146.6, 146.5, 146.8, 56
See application file for complete search history.

(56) References Cited

U.S. PATENT DOCUMENTS

| | | | |
|---|---|---|---|
| 8,894,128 B2* | 11/2014 | Barral | B62D 29/005 |
| | | | 296/146.6 |
| 2011/0179719 A1* | 7/2011 | Matsumoto | B60J 5/10 |
| | | | 49/501 |
| 2016/0214655 A1* | 7/2016 | Demange | B60J 5/0416 |
| 2017/0066306 A1* | 3/2017 | Ueno | B60J 5/101 |
| 2019/0375465 A1* | 12/2019 | Coudron | B60J 5/0481 |
| 2020/0009949 A1* | 1/2020 | Tichy | B29C 65/48 |
| 2021/0283999 A1* | 9/2021 | Harney | B60J 5/045 |

FOREIGN PATENT DOCUMENTS

| | | | | |
|---|---|---|---|---|
| EP | 3018042 A1 * | 5/2016 | | B60J 5/107 |
| WO | WO-2015033076 A1 | 3/2015 | | |
| WO | WO-2018065822 A1 | 4/2018 | | |

OTHER PUBLICATIONS

Mocom, ALTECHPP-BA4915-500MR15, Campus Plastics, Jul. 6, 2018 (Year: 2018).*
Plastipedia The Plastics Encyclopedia, Polypropylene (PP) (Year: 2014).*

* cited by examiner

INTERFACING ELEMENT FOR A LOCK ZONE OF A MOTOR VEHICLE DOOR

TECHNICAL FILED

The invention relates to a rear door of a motor vehicle, such as a plastic tailgate, adapted to safety requirements during an accident affecting the door. More particularly, the invention relates to an element for interfacing with a zone carrying a motor vehicle door lock.

BACKGROUND OF THE INVENTION

The vast majority of the tailgates of the prior art are made of steel. But there are also known tailgates made of plastic material, thermoplastic and/or thermosetting, so as to lighten the tailgate, but while offering different mechanical performances.

A plastic tailgate is made up of two main parts: an inner structural panel, also called a lining, and an outer visible skin.

The lining may be made of thermoplastic material or of thermosetting material, which has better resistance to deformation but which has the disadvantage of being denser, therefore having a greater weight. Thus, a thermoplastic material is often used to lighten the tailgate compared to thermosetting material.

In order to meet the general requirements of those specifications that meet strict standards, it is in particular necessary to reinforce attachment areas of the door on the vehicle, such as a hinge, a lock or even a cylinder, and of which the fastening onto the lining influences in particular the deformation of the tailgate due to sunshine, to opening-closing, or in case of effraction. It is thus usual to add a local steel plate to the lining in order to ensure, in particular for example, a reinforcement of the lock zone and to fasten the lock on it.

In addition, it is also necessary, in the event of a so-called high speed impact (>20 km/h) suffered by the vehicle, to limit the risks of ejecting pieces of the lining toward the inside or outside of the vehicle, which may then constitute projectiles.

To accomplish this, the lining must be robust, in order to avoid or limit the quantity of small pieces created in the event of impact. Furthermore, the lining must be rigid enough to ensure good geometric maintaining of the door during a conventional use.

This is why, when a thermoplastic material is used for manufacturing a door, the dimensioning results in the use of rigid materials, at least for the lining. However, these rigid materials are not very expandable in the event of impact at high speed. Indeed, these rigid materials tend to break into several pieces in the event of a high-speed impact.

This is why, to preserve the connection between the tailgate and the broken pieces, it is known to use a braid of glass fibers or of steel cables, attached to the lining of the door. This connecting braid is generally fastened in a known manner at several points of the lining and left free between these points in order to achieve a peripheral strapping of the door, passing at least through several of the fastening points of the door to the body of the vehicle. Therefore, the breaking of pieces is not prevented, but the pieces, once broken, remain connected to each other, forming a group of disbanded pieces. Depending on the impact conditions, the quantity and size of the broken pieces vary, those which are not directly connected to the braid by a fastening point become completely free, and those fastened to the braid are therefore "almost free" due to the flexibility of the braid sections connecting them.

In the zone and for the particular case of the lock, the local reinforcing plate does not prevent the disengagement of the lock, the weak and breaking point then being moved to the fastening interface between the reinforcing plate and the lining, forming together a metal element that is much more robust than the lining. This heavy assembly, once broken, is only held by the braid to which it is fastened.

SUMMARY OF THE INVENTION

It is the object of the invention to remedy these drawbacks by providing an interfacing element for a lock zone of a motor vehicle door, comprising
  a support made of plastic material, intended to be attached to a lining of the door, the lining being made of plastic material, and
  a reinforcing plate of the lock zone onto which a lock is intended to be fastened, the plate being integrated to the support by overmolding, wherein the support is made of thermoplastic material having a Young's modulus lower than that of the plastic material of the lining of the door, and a coefficient of elongation at break greater than that of the plastic material of the lining of the door.

Thus, the interfacing element constitutes an intermediate zone between the lock and the lining, allowing the lining to be still held at the lock, even if the lining is very deformed or even locally broken in this zone following an impact. Indeed, the support in which the reinforcing plate is overmolded allows to ensure cohesion of the pieces of the lining, which may be formed following an impact, thus preventing their projection inwardly or outwardly of the passenger compartment of the vehicle, and that the lining is no longer held at the lock, thus preventing the door from opening. Also, the interfacing element constitutes an intermediate which is more deformable than the lining. This allows that the lining is still held at the lock, even if the lining is locally broken in this zone following an impact, as the interfacing element is less likely to break following an impact thanks to its mechanical properties.

The interfacing element according to the invention may also include the following features, taken alone or in combination:
  The reinforcing plate is made of a metallic material or a composite material.
  This makes it possible to efficiently fasten a lock on a plate made of rigid material included in the interfacing element. Thus, the lining is still held at the lock, even if the lining is locally broken in this zone following an impact.
  The support is made of a thermoplastic material that is more deformable than that of the lining.
  This allows to achieve an interfacing element which is easy to mold. In addition, unlike rigid materials which have a low elongation at break, thermoplastic materials have a greater elongation at break.
  The support is made of a material having properties as follows:
    a Young's modulus between 500 MPa and 3000 MPa, preferably between 800 MPa and 2000 MPa;
    a coefficient of elongation at break greater than 20%, preferably between 20 and 80%, and more preferably greater than 80%.
  Thus, the interfacing element constitutes an intermediate that is more deformable than the lining, the lining being typically made of polypropylene reinforced with 30% glass fibers (PPGF30). This allows the lining to be held at the lock, in particular by means of the interfacing element, even if the lining is locally broken in this zone following an impact. Indeed, these elongation and elasticity properties of the support under low stresses make it possible to keep the lining connected to the lock when the lining has been deformed or broken under the effect of the impact.

The support is made of a material chosen from unreinforced polypropylene (PP), reinforced polypropylene, unreinforced polyethylene (PE) and reinforced polyethylene.

This makes it possible to benefit from the mechanical qualities of these materials by making use of a high elongation at break and a low density.

The support is of dimensions in the direction of the Y-axis and in the direction of the Z-axis greater than the dimensions in the direction of the Y-axis and in the direction of the Z-axis of the reinforcing plate of the lock.

Thus, this makes it possible to minimize the additional weight of the support when the dimensions in the direction of the Y-axis and in the direction of the Z-axis of the support are slightly greater than the dimensions in the direction of the Y-axis and in the direction of the Z-axis of the reinforcing plate of the lock. Furthermore, the more the dimensions in the direction of the Y-axis and in the direction of the Z-axis of the support are greater than the dimensions in the direction of the Y-axis and in the direction of the Z-axis of the reinforcing plate of the lock, the more this allows to give the interfacing element a larger deformable intermediate zone, and thus allows to absorb greater elongations without breakage in the event of an impact.

Around the reinforcing plate of the lock, the support has bosses forming a hollow, the concavity of which is oriented in the direction of the X-axis with respect to the lining.

This makes it possible to obtain a larger developed surface and to give the support a beam effect, improving the impact strength of the tailgate in the lower part generally comprising the lock zone, as well as a deformable intermediate zone having larger surface and thus suitable to withstand greater deformations before breakage.

The interfacing element also comprises ribs so as to reinforce the resistance of the support in the event of impact.

This makes it possible to prevent the support from being broken in the event of impact, by reinforcing the resistance of the support of the interfacing element, and in particular by reinforcing the bosses of the support.

The invention also relates to a sub-assembly of motor vehicle, comprising a tailgate lining and an element for interfacing a lock zone of a door fastened to an outer face of the lining, where the interfacing element is according to the invention.

Thus, this makes it possible to reinforce the lock zone of the door while maintaining the broken elements linked to each other during an impact. In fact, the interfacing element makes it possible, in particular, to prevent the lock from being expelled from the lock zone towards the inside or outside of the vehicle in the event of impact, while maintaining a satisfactory weight balance and an appropriate economic balance.

The sub-assembly according to the invention may also comprise the following features:

the interfacing element of a door is fastened to the outer face of the lining by means of at least one of the technologies selected from gluing, welding, snap-riveting, overmolding, screwing, riveting, clipping and adhesive bonding.

This allows the interfacing element to be fastened onto the lining of the door by means which are simple and easy to implement in a production chain, in particular in order to increase the production rhythm.

The interfacing element of a door is fastened onto the outer face of the lining by screwing, for example using self-drilling screw.

This makes it possible to fasten the interfacing element onto the lining of the door in a simple, fast and economical manner.

The sub-assembly according to the invention further comprises a connecting member intended, in particular, to retain pieces of the interfacing element or of the lining which may be formed in the event of impact.

This makes it possible to avoid the projection of material fragments in the event of impact and, in particular, to maintain the connection between the fastening points, for example the points for fastening the tailgate to the body, located in the upper and lower zone of the door.

The connecting member is made of thermoplastic material or glass fibers.

This makes it possible to obtain a resistant and suitably shaped connecting member configured to be housed between the lining and the visible skin of the tailgate.

The connecting member is a braid.

This allows to retain broken pieces by a means that is very thin, light and of high tensile strength.

BRIEF DESCRIPTION OF THE DRAWINGS

The invention will be better understood upon reading the description which follows, given solely by way of example and with reference to the accompanying drawings in which.

DETAILED DESCRIPTION OF PREFERRED EMBODIMENTS

Hereinafter, terms such as "longitudinal X-axis" or "X-axis", "transverse Y-axis" or "Y-axis", "vertical Z-axis" or "Z-axis", "front", "rear", "above", "upper", "below", "lower", etc. are understood by reference to the usual orientation of motor vehicles according to the marks shown in the figures.

Figure 1:
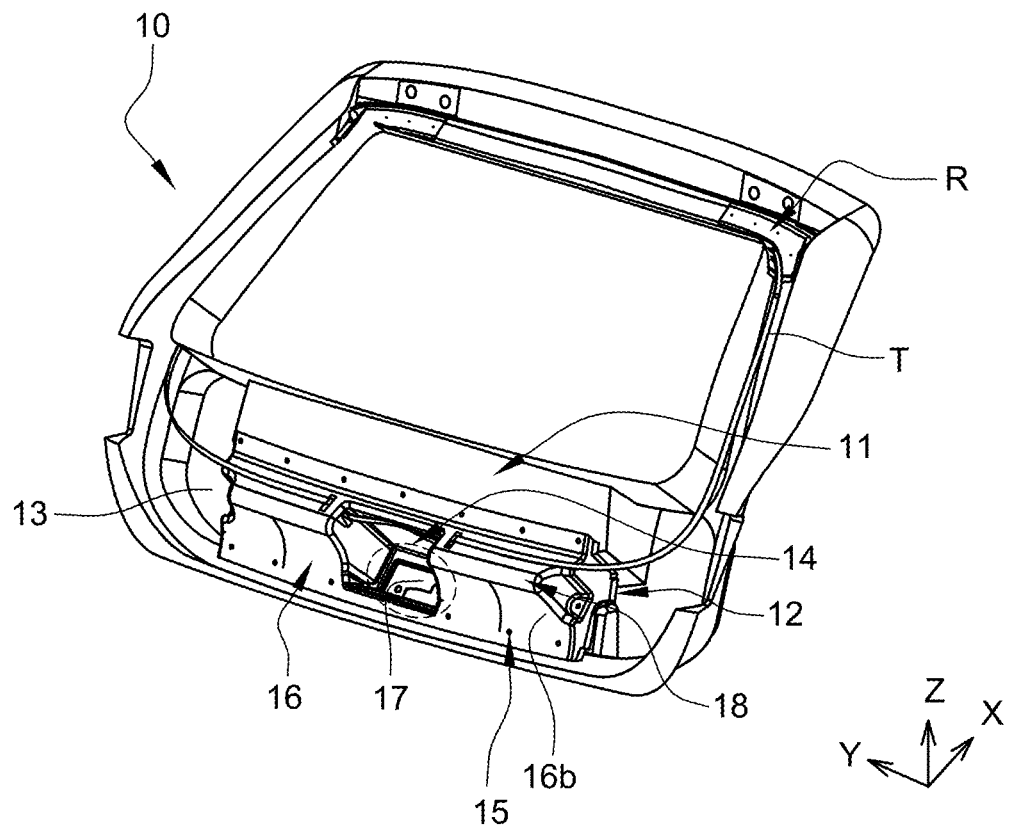
FIG. 1 shows a perspective view of a sub-assembly of motor vehicle according to the invention.

FIG. 1 shows a sub-assembly 10 according to the invention, intended to be attached to a motor vehicle. In the illustrated example, the sub-assembly 10 is a vehicle door, particularly a tailgate, and comprises a lining 11 of the tailgate and an interfacing element 12 of lock according to the invention.

The lining 11 comprises an inner surface, facing a passenger compartment of the vehicle, and an outer surface 13, opposite the passenger compartment.

In the illustrated example, the lining 11 is made of a plastic material, particularly of thermoplastic material, which makes it possible to limit the weight of the tailgate. It should be noted that the lining 11 can also be made of a thermosetting plastic material.

The interfacing element 12 is attached and fastened to the outer surface 13 of the lining 11 at a lock zone 14. The interfacing element 12 can be fastened by gluing, welding, snap-riveting, overmolding, riveting, clipping or even adhesive bonding. Preferably, and as shown in FIG. 1, the interfacing element 12 is fastened by screwing to the outer surface 13 of the lining 11 by using self-drilling screw 15.

A visible external skin (not shown) is intended to be attached to the outer surface 13 of the lining 11, with the interfacing element 12 being fastened onto the outer surface 13 of the lining 11, and therefore positioned between the visible external skin and the lining 11.

Preferably, and as shown in FIG. 1, the door also comprises a connecting member T, which is intended to connect and maintain a connection between one or more elements constituting the door, such as for example the lining 11, the interfacing element 12, a reinforcement R for fastening a cylinder assisting in opening or a hinge and a lock. The connecting member T can also connect one or more elements constituting the door to the body of the vehicle situated for example in an upper and lower zone of the tailgate, thus avoiding the projection of material pieces of elements constituting the tailgate in the event of impact.

In the illustrated example, the connecting member T is a braid of thermoplastic material. The connecting member T can also be made of glass fibers. Note that the connecting member T can also be a cable, for example a steel cable.

Figure 2:
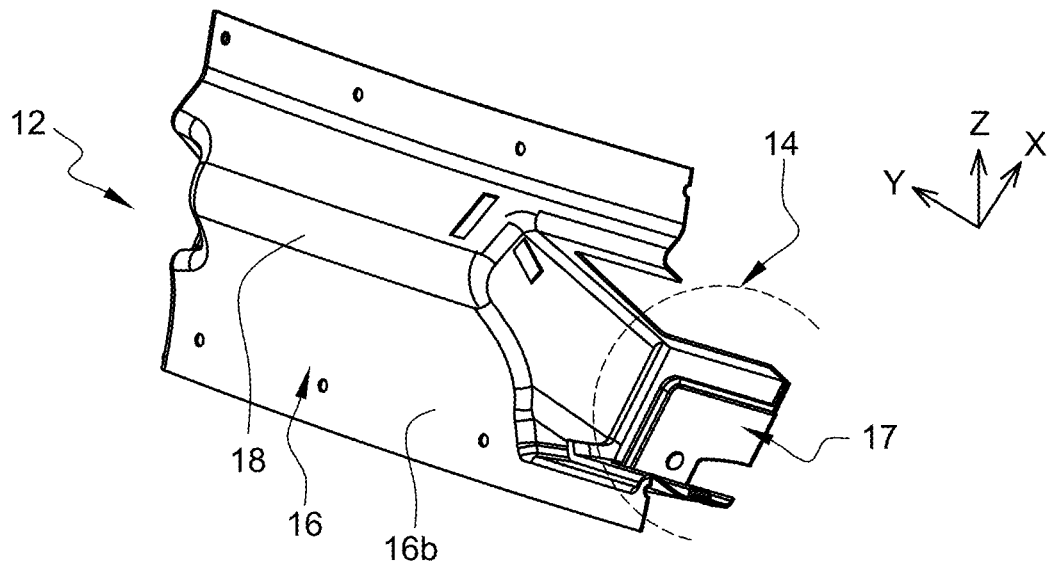
FIG. 2 is a perspective view of a cross-section of an interfacing element according to the invention.

FIG. 2 shows a perspective view of a cross section of the interfacing element 12. The interfacing element 12 of the lock zone 14 of the tailgate comprises a support 16 and a reinforcing plate 17 of the lock zone 14 onto which a lock (not shown) is intended to be fastened.

The reinforcing plate 17 of the lock zone 14 is integrated by overmolding to the support 16. Thus, the support 16 which overmolds the reinforcing plate 17 ensures cohesion of the pieces of the lining 11, which may be formed following an impact, thanks in particular to the capacity of the material of the support 16 to deform itself, and prevents them from being projected inwardly or outwardly of the passenger compartment of the vehicle. Furthermore, the support 16 ensures that the lining 11 is held at the lock, even in the event of partial breakage of the lining 11 during an impact.

The reinforcing plate 17 can be made for example of metallic material or of composite material, for example of composite material reinforced by glass or carbon fibers. Preferably, the reinforcing plate 17 is made of steel.

The support 16 is made of plastic material, preferably of thermoplastic material which is a material easy to mold. The support 16 has an inner surface 16a facing the outer surface 13 of the lining 11, and an outer surface 16b opposite the inner surface 16a of the support 16. In the illustrated example, the support 16 is made of thermoplastic material having a Young's modulus that is lower than that of the plastic material of the lining 11 of the tailgate and a coefficient of elongation at break greater than that of the plastic material of the lining 11 of the tailgate. Thus, the interfacing element 12 constitutes an intermediate that is more deformable than the lining 11, thus allowing the lining 11 to be still held at the lock by means of the interfacing element 12, even if the lining 11 is locally broken in the lock zone following an impact. The support 16 ensures the cohesion of the pieces of the lining 11 which may be formed in the event of an impact, as well as the holding of the lining at the lock.

Preferably, the support 16 is made of thermoplastic material having a Young's modulus between 500 MPa and 3000 MPa and a coefficient of elongation at break greater than 20%. Even more preferably, the support 16 is made of thermoplastic material having a Young's modulus between 800 MPa and 2000 MPa and a coefficient of elongation at break between 20% and 80% and even more preferably greater than 80%. Thus, these elongation and elasticity properties of the support 16 are particularly suitable for allowing to hold the lining 11 at the lock, by means of the interfacing element 12, even if the lining 11 is deformed or broken following an impact.

Materials such as polypropylene (PP), preferably unreinforced, or polyethylene (PE), preferably unreinforced, are particularly suitable for manufacturing the support 16 so as to benefit from their high elongation capacity at break and from their low density.

In the illustrated example, the support 16 has dimensions in the direction of the Y-axis and in the direction of the Z-axis greater than the dimensions in the direction of the Y-axis and in the direction of the Z-axis of the reinforcing plate 17 of the lock zone 14. Hence, the support 16, and thus the interfacing element 12, have a larger interfacing intermediate zone, which allows them to absorb greater elongations in the event of impact without being broken. Preferably, the support 16 has a general shape which has reliefs around the reinforcing plate 17, and more particularly bosses 18 forming a hollow 19 with the lining 11. The hollow 19 forms a free space delimited by the outer surface 13 of the lining 11 and the inner surface 16a of the support 16. The bosses 18 give the support 16 a beam effect, that is to say a structurally reinforcing effect, and thus make it possible to improve the strength of the tailgate in the lower part comprising the lock zone 14 in the event of an impact. According to a variant (not shown), the general shape of the support 16 substantially follows the general shape of the lining 11 of the tailgate in the lock zone, and has dimensions in the direction of the Y-axis and in the direction of the Z-axis slightly larger than the dimensions in the direction of the Y-axis and in the direction of the Z-axis of the reinforcing plate 17 of the lock zone 14, so as to minimize the additional weight of the support 16 on the tailgate.

Figure 3:
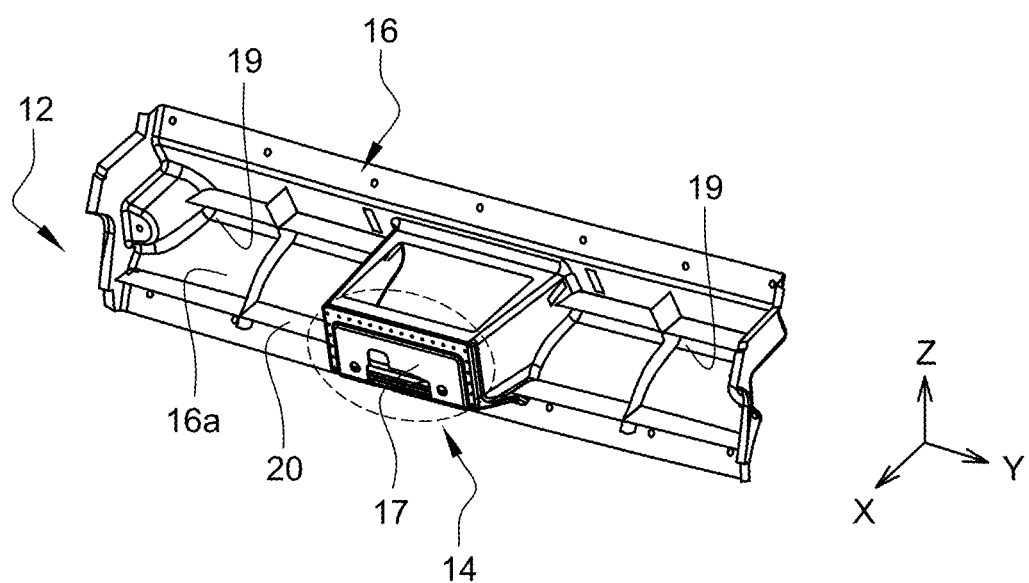
FIG. 3 is a perspective view of an interfacing element according to the invention, showing the inner surface of the support.

Furthermore, and as shown in FIG. 3, the interfacing element 12 comprises ribs 20 which are intended to reinforce the resistance of the support 16 of the interfacing element 12, and in particular to reinforce the bosses 18 of the support 16 in the event of an impact. Thus, the ribs participate in preventing the support 16 from being broken in the event of an impact.

The invention is not limited to the described embodiment and variants, and other embodiments or variants will appear clear to a person skilled in the art. In particular, the interfacing element 12 is not limited to a lock zone, but can relate to any zone comprising an element which has a risk of ejection in the event of an impact, such as, for example, a zone comprising a cylinder or a reinforcement R for fastening a cylinder assisting in opening or a hinge.

The invention claimed is:

1. An interfacing element of a lock zone of a door of a motor vehicle, the interfacing element comprising:
   a support made of thermoplastic material and adapted to be attached to a lining of the door, the lining being made of thermoplastic material;
   a reinforcing plate of the lock zone onto which a lock is adapted to be fastened, the reinforcing plate being integrated to the support by overmolding; and
   wherein the thermoplastic material of the support has a Young's modulus lower than that of the thermoplastic material of the lining and a coefficient of elongation at break greater than that of the thermoplastic material of the lining.

2. The interfacing element according to claim 1, wherein the reinforcing plate is made of metallic material or of composite material.

3. The interfacing element according to claim 1, wherein the thermoplastic material of the support is made is more deformable than the thermoplastic material of the lining.

4. The interfacing element according to claim 1, wherein the thermoplastic material of the support has properties as follows:
a Young's modulus between 500 MPa and 3000 MPa; and
a coefficient of elongation at break greater than 20%.

5. The interfacing element according to claim 1, wherein the support is made of a material chosen from unreinforced polypropylene (PP), reinforced polypropylene, unreinforced polyethylene (PE), and reinforced polyethylene.

6. The interfacing element according to claim 1, wherein the support has dimensions in the direction of a Y-axis of the motor vehicle and in the direction of a Z-axis of the motor vehicle greater than dimensions in the direction of the Y-axis of the motor vehicle and in the direction of the Z-axis of the reinforcing plate.

7. The interfacing element according to claim 1, wherein the support has bosses around the reinforcing plate, which bosses form a hollow whose concavity is oriented in the direction of an X-axis of the motor vehicle with respect to the lining.

8. The interfacing element according to claim 1, further comprising ribs so as to reinforce resistance of the support in the event of impact.

9. A sub-assembly of motor vehicle, the sub-assembly comprising:
a lining of the door, the door being a tailgate; and
the interfacing element according to claim 1 fastened onto an outer face of the lining.

10. The sub-assembly of motor vehicle according to claim 9, wherein the interfacing element is fastened onto the outer face of the lining via at least one of a technology selected from the group consisting of gluing, welding, snap-riveting, overmolding, screwing, riveting, clipping and adhesive bonding.

11. The sub-assembly of motor vehicle according to claim 9, wherein the interfacing element is fastened to the outer face of the lining by screwing.

12. The sub-assembly of motor vehicle according to claim 9, further comprising a connecting member adapted to retain pieces of the interfacing element or of the lining that may be deformed in the event of an impact.

13. The sub-assembly of motor vehicle according to claim 12, wherein the connecting member is made of thermoplastic material or glass fibers.

14. The sub-assembly of motor vehicle according to claim 13, wherein the connecting member is a braid.

15. The sub-assembly of motor vehicle according to claim 11, wherein the screwing is via a self-drilling screw.

16. The interfacing element according to claim 4, wherein the support is made of a material having properties as follows:
a Young's modulus between 800 MPa and 2000 MPa; and
a coefficient of elongation at break between 20 and 80%.

17. The interfacing element according to claim 4, wherein the support is made of a material having properties as follows:
a Young's modulus between 800 MPa and 2000 MPa; and
a coefficient of elongation at break greater than 80%.

* * * * *